May 18, 1954     R. E. KLAGES     2,678,841
TWO-PART BALL FOR UNIVERSAL JOINTS
Filed March 30, 1951
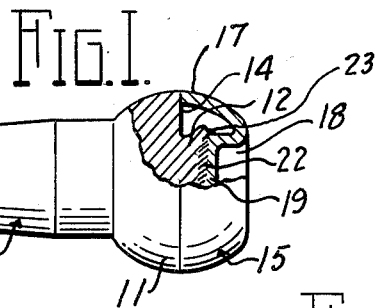
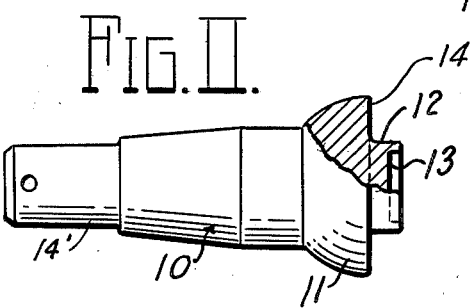 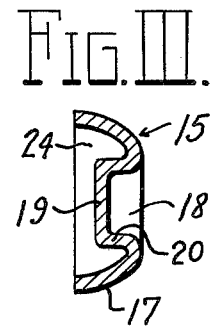
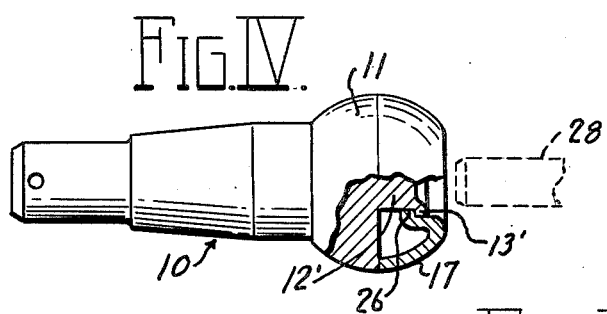
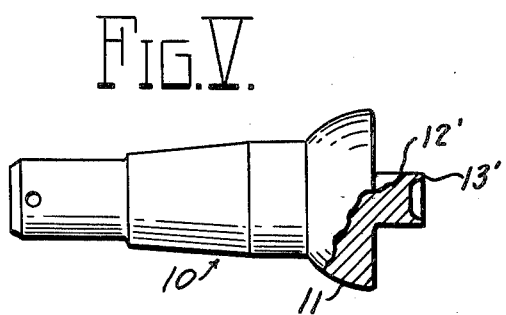 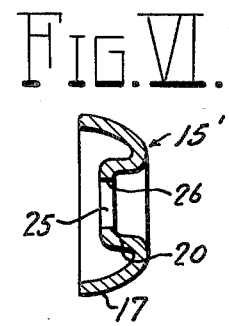
INVENTOR.
Reynold E. Klages
BY
Edmund B. Whitcomb
ATTORNEY

UNITED STATES PATENT OFFICE 2,678,841

TWO-PART BALL FOR UNIVERSAL JOINTS

Reynold E. Klages, Columbus, Ohio, assignor to The Columbus Auto Parts Company, Columbus, Ohio, a corporation of Ohio Application March 30, 1951, Serial No. 218,440

1 Claim. (Cl. 287—90)

The present invention relates to the construction of a two part ball having a wide variety of uses, but particularly adaptable for use in universal joints—and more specifically forming an excellent ball stud construction for a joint in a tie rod and drag link assembly, the present application being a continuation-in-part of my prior application Serial No. 658,775, filed April 1, 1946 for "Two Part Ball Construction," now Patent No. 2,625,736.

One object of the present invention is to effect certain economies in manufacture, since it has been discovered that by making one part a solid half ball (which can be economically cold headed as the stock has sufficient volume per unit of length for this purpose, although insufficient to form a full solid ball), then forming a separate hollow cooperating portion in a relatively cheap manner—as by stamping, coining, etc., and thereupon permanently joining the two parts together, either mechanically or by electric welding, the result is that a very satisfactory substantially full ball construction is produced at a much lower cost than that required to make a full solid ball of the same dimensions. Moreover, the two part ball produced affords substantially the same value as a solid one-piece ball from the standpoint of wear and practicability.

Another object is to provide a two part ball of the type indicated, having certain novel characteristics inherent in its construction in which a two-walled portion is formed in the sheet metal hollow half of the ball, said hollow half thereby being strong and resistant to shear.

A further object of the present invention is to provide a two part ball construction of a type in which both portions may be independently hardened and the two properly welded or mechanically connected without further processing or, in case of welding, without drawing the temper on the bearing surface of the ball contact parts during the welding. Moreover, by this arrangement it is unnecessary to remove any welding flash.

Further objects and advantages are within the scope of this invention such as relate to the arrangement, operation and function of the related elements of the structure, to various details of construction and to combinations of parts, elements per se, as well as the economies of manufacture and numerous other features as will be apparent from a consideration of the specification and drawing of certain forms of the invention, one of which may be preferred, in which:

Figure I is a side elevation partly in section of a combined solid half ball and hollow ball part of one embodiment of the construction;

Figure II is a side elevational view, partly in section, showing the solid half ball and stud;

Figure III is a central, vertical section of a stamping for forming the other half of the ball;

Figure IV is a view similar to Figure I of a modification;

Figure V is an elevation partly in section of the stud and half ball of said modification; and Figure VI is a section of the hollow part thereof.

Referring to the embodiment of the invention illustrated in Figures I, II and III, it will be seen that there is illustrated as one part of the completed unit, a solid one-piece stud and half ball construction having a stud or shank 10 and forged thereto an integral half ball spherical seat bearing finished surface 11, the stud 10 having a central forwardly extending flat wide end portion 12 as an integral part thereof. The end extension 12 has a central recess 13 and the extension 12 forms a wide ledge 14 at the rim portion of the equator of the half ball part 11. Since the size of the rod or wire used in forging the stud and half ball is determined by the smallest diameter as indicated at 14' and since 4½ diameters of wire is the practical limit of wire or stock that can be headed in two blows, the ball and stud 10, with the spherical surface 11 and central extension 12 not being a full, but only a half ball, is reduced in volume so that the unit can be economically made on a two blow cold heading machine. The completed solid half ball part is shown in Figure II where it will be seen that the extension 12 has a central depression or receiving well 13.

In Figure III, I have illustrated the other half of the ball shown in this embodiment as a stamping 15 formed with an external spherical seating outer wall 17 to cooperate with, correspond to and form an extension of the spherical portion 11 of the solid part 10. The stamping 15 is also provided with an inwardly cupped portion 18 providing a flat bottom circular end 19, the periphery of which is connected to the outer wall 17 by the inner wall portion 20. The bottom 19 of stamping 15 fits within the recess 13 on extension 12 of the solid half part 10, whereupon the two main parts of the unit, namely, the solid stud and half ball 10 and the hollow stamping 15 are butt welded together, as indicated at 22 in Figure I. The free rim or edge of wall 17 is in contact with ledge 14. In this embodiment, it will be noted that the two parts 10 and 15 may be separately completely finished and hardened and that by uniting the two parts by a butt weld, as indicated, the heat developed during welding will not draw the temper from the finished bearing spherical surface 11 nor wall 17. Moreover, it is not necessary to remove any welding flash 23 in this case, as this flash is located on the inside of the chamber 24 or hollow portion of the stamping 15, the chamber 24 between the two walls 17 and 20, as indicated.

In the embodiment illustrated in Figures IV, V and VI, the one-piece solid half ball and stud part 10 is made similar to the one in Figure I, excepting that the extension 12' is of much smaller diameter but longer, thereby using the same amount of stock from the stud 10. In this case the recess 13 is used to form the rim 13' and the cooperating hollow metal part 15' has the spherical seat wall portion 17 corresponding to or coextensive of the spherical portion 11 of the solid half ball on the stud. The bottom part 19 of the cup 18 is cut out and removed as indicated at 25, leaving an edge 26 thereof so that when the two parts 10 and 15' are joined together, as shown in Figure IV, the rim 13' on extension 12' is forced down over the lip or edge 26 at the bottom of cup 18 as by mandrel 28, for example, thereby mechanically securing the two half parts of the ball together with the rim of the outer wall 17 in free contact with the ledge on the solid part 10 at the equator thereof as in the embodiment of Figures I, II and III.

It is apparent that, within the scope of the invention, minor modifications and different details in the arrangements may be made other than is herein disclosed, and the present disclosure is illustrative merely, the invention comprehending all variations thereof.

What I claim is:

A two part stud and ball-like portion of a ball joint assembly comprising an integral stud and solid part ball; a solid integral end extension centered in line with the axis of said stud and located at the end of said ball part providing a flat transverse surface substantially at the equator of the ball; and a hollow complementary section having an outer spherically-shaped surface complementary to said solid ball part, said section having an inwardly extending cupped portion thereby forming a one-piece double walled annular construction, the outer wall thereof terminating at substantially the equator of the ball with the edge of said outer wall providing a flat rim surface located in free contact with the flat shoulder of the solid ball part adjacent said equator, the inner wall of said double walled section provided with a transverse portion at the lower end of the cup thereof, said transverse portion forming means whereby said hollow complementary section is joined to said solid ball part; said central extension of said stud and solid part and the inner end of the cupped portion of said hollow section being immovably interlocked and integrally united together to form means to permanently connect said end extension of said solid ball part and the transverse portion of the cup of said complementary hollow section with the outer surface of said section in contact with the solid ball part adjacent the equator thereof and the spherical outside contour of said hollow section and said solid ball part conforming with each other to form the spherically-shaped ball-like portion of said joint.

References Cited in the file of this patent

UNITED STATES PATENTS

| Number | Name | Date |
|---|---|---|
| 2,077,582 | Peo | Apr. 20, 1937 |
| 2,108,814 | Flumerfelt | Feb. 22, 1938 |
| 2,271,293 | Flumerfelt | Jan. 27, 1942 |
| 2,280,634 | Flumerfelt | Apr. 21, 1942 |
| 2,369,091 | Venditty | Feb. 6, 1945 |
| 2,392,063 | Reimann | Jan. 1, 1946 |
| 2,420,621 | Ricks | May 13, 1947 |
| 2,444,121 | Venditty | June 29, 1948 |